May 12, 1959

M. J. GRADY 2,886,093

SUPPLEMENTAL SEAT FOR VEHICLES

Filed Nov. 5, 1954

INVENTOR.
Maurice J. Grady.
BY
Harness, Dickey & Pierce
ATTORNEYS.

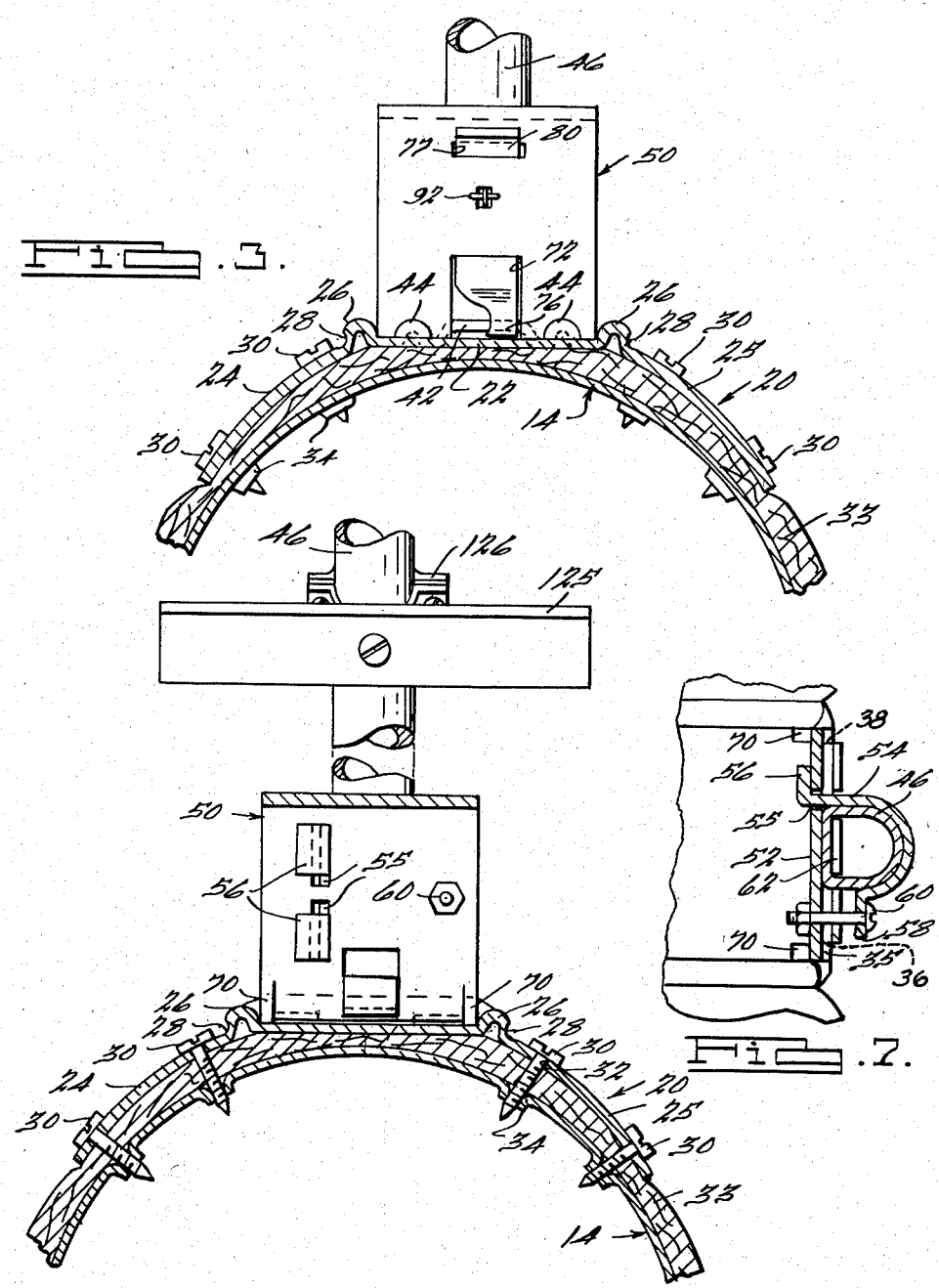

May 12, 1959
M. J. GRADY
2,886,093
SUPPLEMENTAL SEAT FOR VEHICLES
Filed Nov. 5, 1954
3 Sheets-Sheet 3
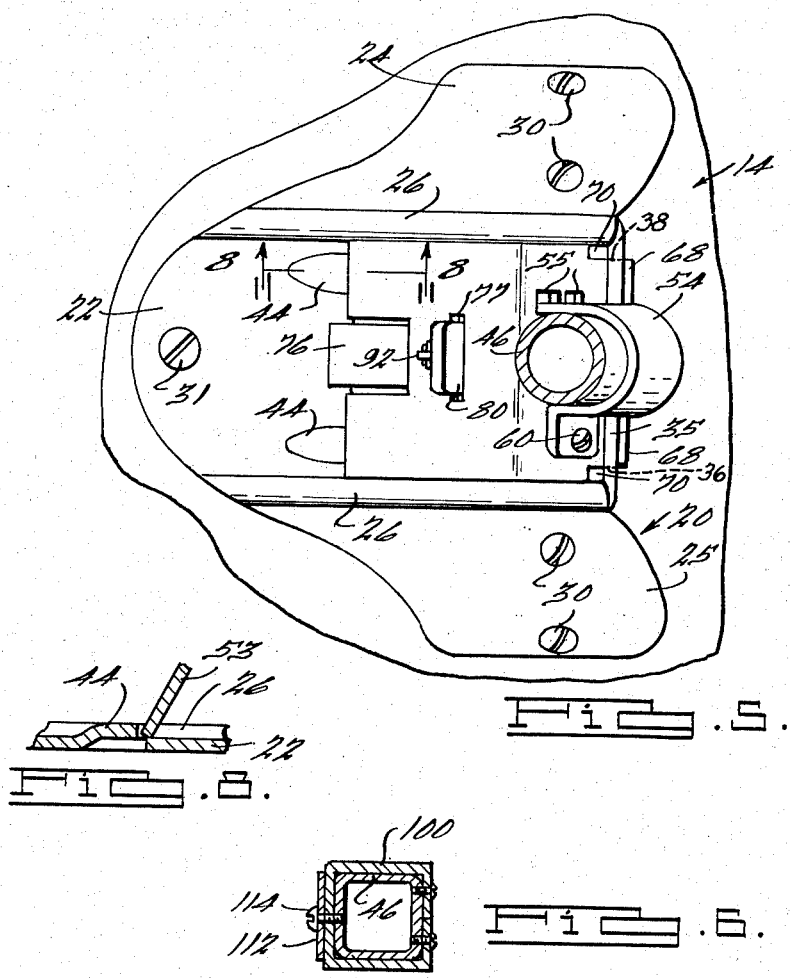
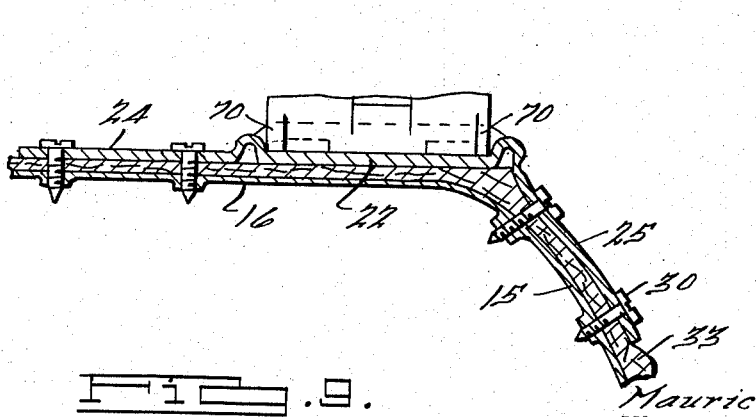
INVENTOR.
Maurice J. Grady
BY
Harness, Dickey & Pierce
ATTORNEYS

United States Patent Office 2,886,093
Patented May 12, 1959

2,886,093

SUPPLEMENTAL SEAT FOR VEHICLES

Maurice J. Grady, Royal Oak, Mich.

Application November 5, 1954, Serial No. 466,961

10 Claims. (Cl. 155—13)

The present invention relates to vehicle seats, and particularly to a new and improved auxiliary seat intended especially for the use of children when riding in motor vehicles.

An important object of the invention is to provide an improved automobile seat for children which provides increased safety for the child, which is comfortable and attractive to children, and which is so positioned that the child's head when occupying the seat is at approximately the same elevation as that of an adult occupant of the regular seats of the car, so that the child is afforded a better view from the vehicle.

A further object is to provide such a seat which does not detract from the adult seating space.

A further object is to provide such a seat which is easily and quickly adjustable to accommodate children of different sizes.

Still another object is to provide such a seat which is easily displaced, merely by tilting it forward on a hinge, to permit easy passage of other occupants into and from the car or from one side of the car to the other.

Still another object is to provide such a seat which is very compact and which is easily and quickly removable and adapted to be carried in the trunk of the car or removed entirely when not needed.

Still another object is to provide such a seat which may be very easily and quickly installed in the vehicle, and as easily removed therefrom.

Still another object is to provide such a seat which is adapted to be supported entirely from the floor of the vehicle, by means of an anchor plate which is permanently attached to the vehicle floor.

In an automobile of the sedan type, if desired, two such anchor plates may be provided, one in the front compartment and one in the rear compartment, even though it is only desired to employ a single seat. The seat may then be selectively installed either in the front compartment or the rear compartment, and easily moved from one compartment to the other at will, so that the child may ride in the front with the driver when no other adults are present, or if desired, may be placed in the rear compartment.

A further very important object is to position the child, whether the seat be installed in the front or rear compartment, in a position of increased safety. When the seat is installed in the rear compartment of a sedan, the child is positioned in the middle and directly behind the back of the front seat, where he can conveniently lean upon or rest his elbows upon the back of the front seat, which is a position children naturally like to assume and frequently do assume merely by standing in the rear compartment, when no special seat is provided for them. In this position, in the event of a sudden stop or accident the child can only move a few inches before his forward movement is arrested by the cushioning afforded by the back of the front seat, and cannot be thrown forwardly for a greater distance or upwardly and forward in such manner that he might fly over the back seat and into the windshield or forward portions of the car structure. If my improved seat is installed in the front compartment, the child is positioned close to the instrument panel, which, in many modern cars, is padded. In event no padding is provided however, a child, again, can only move forwardly a relatively few inches before striking the instrument panel, so that the possible momentum and impact, in event of a sudden stop or accident, are limited to this extent.

Still another object is to provide such an improved child's seat which is simple and inexpensive to construct, rigid in construction, and well adapted to quantity production methods.

Other objects and advantages will become apparent upon consideration of the present disclosure in its entirety.

Referring now to the drawings.

Figures 1, 2:
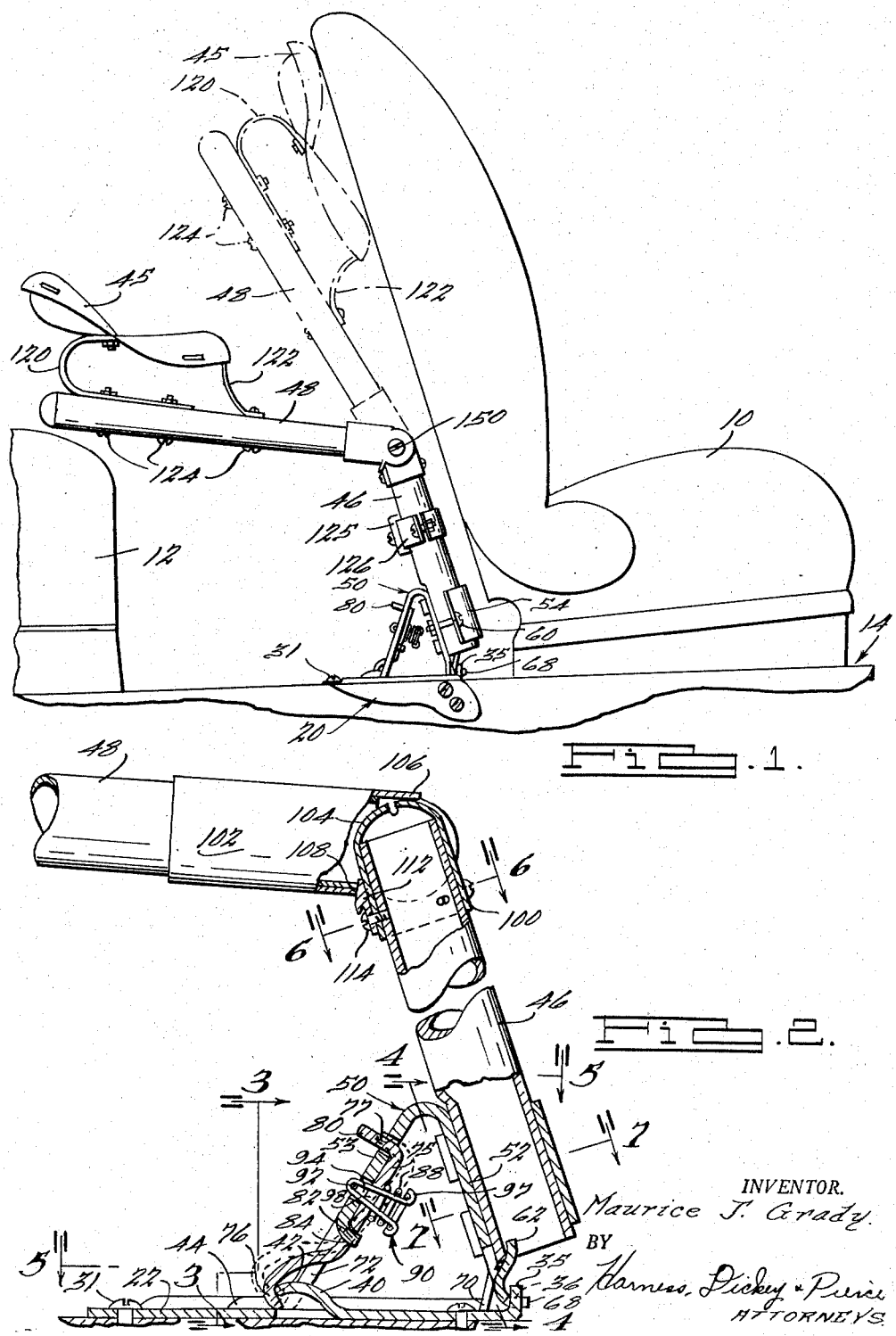
Figure 1 is a fragmentary side elevational view of the seats and adjacent portions of a motor car of the sedan type, showing a supplemental seat constructed in accordance with my present invention, installed in the rear compartment.
Fig. 2 is an enlarged fragmentary side elevational view of principal components of my improved seat, with parts broken away and shown in section.

Figs. 3, 4, 5, 6 and 7 are sectional views taken substantially on the lines 3—3, 4—4, 5—5, 6—6 and 7—7 respectively of Fig. 2 and looking in the direction of the arrows;

Fig. 8 is a sectional detail taken substantially on the line 8—8 of Fig. 5 and looking in the direction of the arrows; and Fig. 9 is a view similar to Fig. 4, but partly broken away, showing a somewhat different method of installing the anchor plate, this method of installation being frequently convenient when installing the anchor plate in the front compartment of a motor car.

Referring now to the drawings, in Fig. 1 the front seat, designated 10, and rear set, designated 12, of a sedan-type automobile are illustrated diagrammatically and fragmentarily, together with a portion of the floor, generally designated 14. The particular floor portion shown comprises the propeller shaft tunnel or housing which, as best shown in Figs. 3 and 4, and as is well known, is customarily an upwardly convexed substantially cylindrical portion of the floor, extending longitudinally centrally of the floor to provide clearance for the propeller shaft.

In conventional automobile construction widely used today, such upwardly projecting tunnel portion 14 is enlarged and widened in the front compartment, to form the portion commonly termed the "doghouse," in the trade, which provides clearance for transmission and/or clutch components of the vehicle mechanism, arranged therebeneath. The rear part of the "doghouse" is frequently inclined or rounded at the sides, as indicated at 15 in Fig. 9, and may be flat or substantially flat at the top, as shown at 16 in Fig. 9.

My improved seat structure includes a unique sheet steel anchor plate so designed and constructed that it is adapted to be easily shaped by the installer to conform to embossed floor portions such as the tunnels and doghouses of cars of different types, and wherein such parts may be of varying shape.

In Figs. 1 and 5, the anchor plate, generally designated 20, is shown installed upon the propeller shaft tunnel, and further details of the mode of installation of the anchor plate may be seen in Figs. 3 and 4. As shown in these views, the anchor plate includes a central base portion 22 which is flat, and which remains flat regardless of the method or position in which the anchor plate is installed. The plate is always installed with the flat base portion 22 extending longitudinally of the vehicle. On either side of the base portion, securing wing portions 24, 25 are provided, separated from the central base portion 22 by integral bendable portions, defined by longitudinally upwardly embossed beads 26, 26, one such bead being provided upon each side of the central base section. The metal of each such bead is thinned, throughout the entire length of the bead, in the area where it joins the adjacent wing 24, 25, such thinned portions being best shown in Figs. 3 and 4, and designated 28. By reason of the provision of the beads and thinned portions 26, 28, the securing wings may be bent with respect to the central base portion 22, from the coplanar relation in which the anchor plate is initially formed, to any suitable angular relationship to conform to the contouring of the tunnel or front embossment, the showings of Figs. 3, 4 and 9 being merely typical of the relationships assumed by these parts when suitably bent and installed, as shown. It is obvious that the thinned bead portions perform what might in the broadest sense be termed a hinging function by permitting the securing wings 24, 25 to be swung to desired angularity, although when so bent they of course tend to retain their angular relationship.

Considering a rear compartment installation such as shown in Figs. 3 and 4, for example, it is merely necessary to place the flat, central base portion 22 of the anchor plate on top of the tunnel 14, extending longitudinally, and press downwardly upon the wings 24, 25, to cause the latter to bend and curve to substantially conform to the tunnel. As shown in Figs. 3, 4 and 9, the wings may be held in their desired positioning and in fact the bending of the wings may be completed by the installation of suitable holding means such as the sheet metal screws 30, which are projectable through suitable holes as 32 in the anchor plate wings. The sheet metal screws are of course pointed at the ends, and may easily be forced through the floor covering or rug which commonly covers the tunnel of most motor cars, such a floor covering being shown at 33. They may be tapped with a hammer to drive them into and partially through the sheet metal of the tunnel, and screwed home, as shown in Figs. 3, 4 and 9, forming their own threads in the bosses as 34 which they form in the sheet metal of the tunnel, in the case of Figs. 3 and 4, or in the doghouse 15—16, in the case of Fig. 9.

As shown in the latter view, the anchor plate is installed upon the right side of the doghouse, Fig. 9 being a sectional view transversely of the vehicle. In this instance, inasmuch as the doghouse portion to which the anchor plate is to be attached is wider than the base portion 22 and left wing 24, these portions of the anchor plate remain coplanar, while the right wing 25 is bent downwardly and secured to the right side portion 15 of the doghouse in a manner corresponding to that in which the right wing is secured to the right side of the tunnel, in a rear compartment installation such as is shown in Figs. 3 and 4. A sheet metal screw as 31 may also be provided centrally in the rear portion of the base section 22, as best shown in Figs. 2 and 5.

Considering further the construction of the base section 22 of the anchor plate, it will be seen that a substantially straight transverse upwardly projecting flange 35 extends across the front of the base section. A pair of horizontal slots 36, 38 are provided in and near the base of the flange 35, one such slot being located near each end of the laterally extending flange, near the positions at which the flange joins the longitudinally extending beads 26.

In a position nearer the back of the base section of the anchor plate and centrally of the width thereof, the metal of the plate is slit, and the metal forwardly of such slit is pressed or embossed upwardly, as shown at 40, the rear edge of such slit portion being forced to a position spacedly above the top plane of the base section. A raised shoulder-like or lip portion 42 is thus defined which constitutes a keeper for a holding latch presently to be described. On either side of the slit which forms the keeper lip 42, additional transverse slits are provided in the base plate portion, and the metal just to the rear of such additional slits is also embossed upwardly, as indicated at 44, one such embossment being provided on each side of the keeper lip 42.

It will be observed that all of the configurations and embossments of the anchor plate are relatively low, so that when only the anchor plate is in place in the vehicle, it does not interfere with the use of the floor by the passengers, or constitute a hazard in so far as any likelihood that it might cause a passenger to trip.

The seat itself is shown as of the saddle type, the saddle being designated 45, although the exact shape and type of the seat will be recognized as optional. The seat is carried by a pair of hingedly interconnected supporting post sections 46, 48, comprising an upper section 48 by which the saddle is carried, and a lower section 46 which is adapted to be detachably secured to and supported upon the anchor plate 20.

The post assembly is securable to the anchor plate by means of a connecting and supporting angle member 50. Angle member 50 may be formed of sheet metal and is bent to inverted V-section. One leg of the V is rigidly secured to the lower post section 46. Such leg of the V is designated 52 and the lower portion thereof projects below the lower end of the post 46 and is designed for releasable interconnection with the base portion 22 of the anchor plate in a manner which will presently be described. A portion of leg 52 which lies against the wall of the post section 46 may be secured thereto as by means of a clamp member 54. As best shown in Fig. 7, the angle member 50 is substantially wider than the diameter of the post 46, and may be of such width as to substantially fill the distance between the beads 26, 26.

The post sections 46, 48 may be formed of sheet metal tubing. The rear portion of the tube section 46 which bears against the leg 52 of the angle member 50 may be flattened to conform to the leg of the angle member. At two vertically spaced positions the leg 52 is slotted, as indicated at 55, slightly to one side of the position occupied by the tube section 46, and the clamp member 54 is provided with tongues 56 adapted to project through the slots 55. The tongues 56 are angularly bent so that they project laterally behind adjacent portions of the wall of the angle members to retain the clamp. The intermediate portion of the clamp 54 is shaped to wrap around the opposite surface of the tube 46, and adjacent the opposite wall of the lower extremity of the tube portion 46, the clamp is provided with a laterally bent tongue portion 58 apertured for the passage therethrough of a clamping screw 60 which is also adapted to project through a suitably positioned hole (undesignated) in the wall of the leg 52. The lower portion of the front leg 52 of angle bracket 50 is also provided with an upwardly projecting tongue 62 which is struck forwardly from the metal of the bracket and which is so proportioned that the lower extremity of the wall of tube 46 is adapted to project between the inner face of the tongue and the outer face of the leg 52 of the bracket. A tight mechanical interlock is thus provided at the extreme lower edge of the tube wall, between the latter and the supporting angle bracket 50, while when the clamp is tightened by means of the screw 60, the leg 52 and the lower portion of the tube are tightly held together throughout a substantial area, as will be apparent.

The front leg or wall 52 of supporting angle bracket 50 is provided, at a position near but spaced from each of its forward lower corners, with a forwardly projecting tongue portion 68. Each of the tongues 68 is adapted to project through one of the slots 36 in the front flange 35 of base portion 22. The metal of the front wall 52 of the bracket lying just outside each of the tongues 68 is bent angularly downwardly and rearwardly to form an integral leg portion which, when the supporting bracket 50 is fitted upon the anchor plate in the manner shown in Fig. 2, bears against the top of the base portion 22.

The leg portions 70 are somewhat longer than would be required in order to provide tight engagement with the upper surface of the base portion 22. Thus in the event looseness develops after use of the support, the bracket can be retightened simply by bending the legs 70 to a more nearly vertical position.

The rearward leg or wall of angle bracket 50 extends angularly downwardly and rearwardly at such an angle that its lower edge would interfere with the keeper lug 40, were it not for the fact that such rear leg 53 of the bracket is provided with a clearance slot 72 which extends upwardly from its lower edge. The unslotted portions of the leg 53 which straddle the keeper lug 40 engage the front faces of the abutments 44 previously mentioned, so that when installed in the manner shown in Fig. 2, the bracket 50 is braced against rearward movement by the abutments 44, and is held against forward and upward movement by the interengagement between the lugs 68 and slots 36 and the adjacent parts.

The back leg 53 of the bracket also carries a sheet metal latch bolt, generally designated 75, pivotally attached to the rear leg 53 of the bracket, in a manner to be described, and having a hooked lower extremity 76 adapted to overengage the lip 42 of the keeper lug 40. The latch hook portion 76 is movable from the position shown in Fig. 2, in which it overengages the lip 42 of the keeper lug 40, and holds the rear portion of the bracket 50 against upward movement, to a free position, indicated in dotted lines in that view. It will be apparent that when the latch hook is thus disengaged, the bracket can be rocked forwardly to lift the rear leg and disengage it from the abutment portions 44, whereafter the bracket and the attached seat support may be pulled rearwardly to disengage the lugs 68 from the slots 36. The legs 70 are of such length (and may be adjusted by bending, in the manner previously described) that when the procedure just described is reversed, in installing the bracket, the bottoms of the legs bear tightly against the upper surface of the base portion 22 slightly before the rear leg 53 reaches the fully lowered position. The legs 70 thus take up all clearance between the parts as the bracket reaches the latched position.

The central portion of the latch bolt is rockably secured to the inner, forward face of bracket wall 53, and the hooked portion 42 of the latch bolt extends downwardly and rearwardly through the clearance slot 72. The central portion of the bolt extends parallel to and closely adjacent the leg 53, and at a position near the top of the latter. It is again bent rearwardly and upwardly, projecting through a slot 77 in the leg 53 and outwardly behind such leg to an accessible position, as shown, where its projecting extremity, designated 80, may serve as a finger piece.

A wall portion of the leg 53 at the upper extremity of the slot 72 is bent inwardly and forwardly, to form a tongue 82 which defines the pivot upon which the latch bolt rocks, the latch bolt being provided with a slot 84 which loosely overengages the tongue 82. It will be seen that when the thumb piece 80 is pressed inwardly, the entire bolt assembly swings on the tongue 82, rocking the hooked portion 76 rearwardly and upwardly from the engaged position in which it is shown in full lines in Fig. 2 to the released position shown in dotted lines in that figure. The latch bolt is yieldably held engaged by suitable spring means, shown as a coil compression spring 88 held upon a hairpin-type retainer 90 which is secured, as by a pin 92, in a slot 94 in the leg 53, the retainer projecting through slot 94 and through a mating slot 95 in the latch piece to a position behind the latter, where it holds the spring, which is trapped upon the legs of the hairpin retainer between the rear face of the latch piece and the hooked extremities 97 of the spring retainer.

The tube portions 46 and 48 are preferably pivotally connected by hinging means which is so designed that it is impossible for the fingers or clothing of the occupant to be caught in any of the hinged parts. As best shown in Figs. 1 and 2, such hinging means comprises a pair of pivotally interconnected sleeves, 100, 102, the former fitted over and secured to the upper end of the tube 46 and the latter fitted over and secured to the lower end of the tube 48.

The sleeve portion 100 and the upper extremity of the tube 46 are preferably of square cross section, and the sleeve portion 102 and the extremity of tube 48 upon which it is fitted may also be squared. The main portions of the tubing may be round, and the square sections formed by swaging. The sleeve portion 100 is preferably die cut and folded from sheet metal, and provided with an integral guard portion 104, which extends upwardly and in an arc over the otherwise open end of the sleeve and tube 46. The portion 104 defines a segment of a cylinder which is concentric with the axis of pivotal movement of the hinged parts, and the sleeve 102 is so shaped as to lie close to, or wipingly engage, the cylindrical surface of the portion 104 at all times. Thus there is no substantial clearance, or change of clearance, during swinging movement of the parts. The sleeve portion 102 is slightly wider than and overengages the sides of the sleeve 100, to which it is connected by a simple riveted hinge pin 150. Although the upper and lower free edge portions, designated 106, 108, of the sleeve 102 are of such length as to lie closely adjacent a cylindrical wall portion 104 carried by the lower sleeve 100 during pivotal movement of the parts, as previously indicated, it will be apparent that when the tube section 48 moves to the lowered, substantially horizontal position it assumes when in use, the edge 108 moves downwardly below the rear extremity of the cylindrical portion 104, and over the flat back wall of the sleeve 100. A clearance would thus develop between the edge 108 and the rear wall of the sleeve 100, and to prevent this I provide a filler block 112, which is secured to the rear face of the sleeve 100, as by means of the pin 114. Pin 114 also serves to secure the sleeve to the tube 46, and the filler block 112 also serves as a reinforcement at the point of engagement at the edge 108, since these parts are forced together by the weight of the occupant of the seat.

As brought out in Fig. 1, the anchor plate 20, in a rear compartment installation, is normally attached to the tunnel 14 just behind the front seat 10. The length of the tubular post sections 46, 48, and the angular position assumed by the latter when lowered to the position of use, are preferably such that even where the front and rear seats are spaced rather close to one another, as they are in close-coupled sedans, the rear portion of the post section 48 is somewhat higher than the top of the cushion of the rear seat 12. The saddle-type seat may be secured to post section 48 by metallic straps 120, 122 which are in turn attached to the post by suitable nut and bolt means as 124. I preferably provide a plurality of selectively usable holes in the post section 48 for the bolts 124, so that the seat may be moved to different positions to accommodate children of different sizes.

A footrest is also preferably provided for small children, and this may take the form of a transverse bar 125 securable to the lower post section 46 as by friction clamp means 126. It will be apparent that by loosening the clamp means, the footrest may be adjusted vertically.

Fig. 2 shows, in dotted lines, the seat and upper post section 48 swung upwardly against the back of the front seat 10. When in this position it is out of the way of passengers moving across the rear seat. When it is desired to completely remove the auxiliary seat and post assembly, it is merely necessary to release the latch piece 75, in the manner previously described, and remove the entire assembly consisting of the two post sections, the supporting angle bracket 50 and latching parts, together with the seat, from the permanently attached anchor plate 20. Such removable assembly occupies very little space, and may conveniently be carried in the trunk of the automobile. Unless it is desired to use the absolute maximum space within the vehicle body, however, it may, when not in use, simply be left in the position shown in dotted lines in Fig. 1.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

What is claimed is:

1. A supplemental seat structure, particularly for motor vehicles, comprising a floor anchor plate, a support detachably securable to said plate in rigidly upstanding relation, a seat carried by said support, said support comprising hingedly interconnected upper and lower tube sections, releasable latching means carried partly by said plate and partly by the lower end of said lower tube section, the seat being carried by the upper tube section, the axis of hinging movement of said sections being substantially horizontal, and means limiting downward hinging movement of the upper section with respect to the lower section.

2. A supplemental seat structure, particularly for motor vehicles, comprising a floor anchor plate, a support, means detachably securing said support to said plate in rigidly upstanding relation, and a seat carried by said support, said anchor plate being formed of sheet metal and including a longitudinally extending central base section, a pair of spaced longitudinally extending bendable portions, one located on each side of said base portion, and anchoring parts connected to said base section by said bendable portions, said bendable portions being bendable more easily than the base section.

3. A structure as defined in claim 2 wherein said bendable portions comprise longitudinally extending ribs, at least a part of each of said ribs being reduced in thickness to facilitate bending thereof about a longitudinal axis.

4. In a supplemental seat structure for motor vehicles, a floor anchor plate, a post-like seat support, means for rigidly but detachably securing said support to the plate in upstanding relation thereto, comprising a bracket member of generally inverted V-form, fastening portions carried partly by said bracket and partly by the plate for securing the bracket to the plate with one of the V-legs of the bracket extending forwardly and downwardly from the bight of the V and with the other leg extending rearwardly and downwardly from the bight of the V, and means for securing the support to the bracket.

5. A structure as defined in claim 4 including interengageable abutment portions carried by said legs and plate and opposing movement of the legs away from one another, and abutment portions also holding at least one of said legs against upward movement, said support being rigidly secured to a leg which is so held against upward movement.

6. A structure as defined in claim 4 including interengageable abutment portions carried by said legs and plate and opposing movement of the legs away from one another, abutment portions also holding one of said legs against upward movement, said support being rigidly secured to a leg which is so held against upward movement, and releasable latch means carried by the other leg and interengageable with the plate for holding said other leg against upward movement.

7. A supplemental seat structure, particularly for motor vehicles, comprising a floor anchor plate, an elongated seat support, a seat carried by an upper portion of said support, means for detachably securing said support to said plate in rigidly upstanding relation thereto comprising an attaching member of inverted V-form having downwardly angularly divergent legs securable at their lower extremities to spaced portions of said anchor plate, and means securing a lower portion of said support to one of said legs.

8. A supplemental seat structure as defined in claim 7, said support being formed in two pivotally interconnected sections, the lower one of said sections being secured to said one leg, and the other section being swingable in a vertical plane with respect to said one section.

9. A supplemental seat structure as defined in claim 7, particularly for motor vehicles, wherein said anchor plate is formed of bendable sheet metal and includes a plurality of spaced securing parts including abutment portions adapted to hold the lower ends of said legs against spreading apart, and also includes holding means preventing upward displacement of said legs from said plate.

10. A supplemental seat structure, particularly for motor vehicles, comprising a floor anchor plate, an elongated seat support, a seat carried by an upper portion of said support, means for detachably securing said support to said plate in rigidly upstanding relation thereto comprising an attaching member of inverted V-form having downwardly angularly divergent legs securable at their lower extremities to spaced portions of said anchor plate, means securing a lower portion of said support to one of said legs, and means for releasably securing said attaching member to said plate including a releasable holder carried by the other of said legs.

References Cited in the file of this patent

UNITED STATES PATENTS

| | | |
|---|---|---|
| 647,286 | Zack | Apr. 10, 1900 |
| 872,410 | Grannis | Dec. 3, 1907 |
| 944,536 | Bonfield et al. | Dec. 28, 1909 |
| 1,015,799 | Hazen | Jan. 30, 1912 |
| 1,261,396 | Jackman | Apr. 2, 1918 |
| 1,915,234 | Magusin | June 20, 1933 |
| 2,195,013 | Rastetter et al. | Mar. 26, 1940 |
| 2,299,178 | Reiter | Oct. 20, 1942 |
| 2,587,912 | Simpson | Mar. 4, 1952 |
| 2,675,056 | Bell | Apr. 13, 1954 |